US012764522B2

(12) United States Patent
Speicher et al.

(10) Patent No.: US 12,764,522 B2
(45) Date of Patent: Oct. 13, 2026

(54) DETERMINING BASE STATION INTERNET PROTOCOL ADDRESS BASED ON VARIABLE LENGTH BASE STATION IDENTIFIER

(71) Applicant: QUALCOMM Incorporated, San Diego, CA (US)

(72) Inventors: Sebastian Speicher, Wallisellen (CH); Lenaig Genevieve Chaponniere, La Jolla, CA (US); Luis Fernando Brisson Lopes, Swindon (GB); Karl Georg Hampel, Jersey City, NJ (US); Hong Cheng, Basking Ridge, NJ (US); Francesco Pica, San Diego, CA (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 18/698,686

(22) PCT Filed: Dec. 6, 2022

(86) PCT No.: PCT/US2022/081017
§ 371 (c)(1),
(2) Date: Apr. 4, 2024

(87) PCT Pub. No.: WO2023/122429
PCT Pub. Date: Jun. 29, 2023

(65) Prior Publication Data

US 2024/0414524 A1 Dec. 12, 2024

(30) Foreign Application Priority Data

Dec. 21, 2021 (GR) .............................. 20210100902

(51) Int. Cl.

*H04W 8/26* (2009.01)
*H04W 48/08* (2009.01)
*H04L 61/4511* (2022.01)

(52) U.S. Cl.

CPC ............. *H04W 8/26* (2013.01); *H04W 48/08* (2013.01); *H04L 61/4511* (2022.05)

(58) Field of Classification Search

CPC ....... H04W 8/26; H04W 48/08; H04W 24/02; H04L 61/4511
See application file for complete search history.

(56) References Cited

U.S. PATENT DOCUMENTS 7,730,321 B2 * 6/2010 Gasparini ............... G06F 21/31 713/182
7,768,983 B2 * 8/2010 Nylander .............. H04W 36/10 370/320

(Continued)

FOREIGN PATENT DOCUMENTS

CA 2404161 C * 5/2006 ........... H04L 9/3073
CA 2837405 A1 * 6/2014 .......... H04L 61/4511

(Continued)

OTHER PUBLICATIONS

3GPP TS 38.300, "3rd Generation Partnership Project; Technical Specification Group Radio Access Network; NR; NR and NG-RAN Overall Description; Stage 2 (Release 16)", 3GPP TS 38.300, V16.8.0, 3rd Generation Partnership Project, Mobile Competence Centre, 650, Route Des Lucioles, F-06921 Sophia-Antipolis Cedex, France, Dec. 18, 2021, 152 Pages, XP052098268, Paragraph [15. 3.4].

(Continued)

*Primary Examiner* — Michael A Keller
(74) *Attorney, Agent, or Firm* — Harrity & Harrity, LLP

(57) ABSTRACT

Various aspects of the present disclosure generally relate to wireless communication. In some aspects, a base station (Continued)

may receive a cell identifier associated with a neighboring base station. The base station may transmit, to a domain name system (DNS) server, a query constructed based at least in part on reversing a set of bits in the cell identifier. The base station may receive, from the DNS server and based at least in part on the query, an Internet Protocol (IP) address associated with the neighboring base station. Numerous other aspects are described.

30 Claims, 6 Drawing Sheets

(56) References Cited

U.S. PATENT DOCUMENTS

| | | | | |
|---|---|---|---|---|
| 7,904,450 | B2 * | 3/2011 | Wilson | H04L 9/3271<br>707/723 |
| 8,261,351 | B1 * | 9/2012 | Thornewell | H04L 61/4511<br>713/153 |
| 8,761,757 | B2 * | 6/2014 | Costelloe | H04W 8/24<br>455/418 |
| 9,342,698 | B2 * | 5/2016 | McPherson | H04L 61/4511 |
| 9,491,135 | B1 * | 11/2016 | Earl | H04L 61/4511 |
| 9,686,226 | B1 * | 6/2017 | Gardner | H04L 61/4511 |
| 9,836,908 | B2 * | 12/2017 | Spanos | H04L 9/3239 |
| 9,849,364 | B2 * | 12/2017 | Tran | G16H 40/63 |
| 9,871,794 | B2 * | 1/2018 | Joffe | H04L 63/1433 |
| 9,948,603 | B1 * | 4/2018 | Lee | H04L 61/106 |
| 9,992,022 | B1 * | 6/2018 | Chapman | H04L 9/3236 |
| 10,046,228 | B2 * | 8/2018 | Tran | A42B 3/30 |
| 10,339,523 | B2 * | 7/2019 | McDonough | G06Q 20/308 |
| 10,484,178 | B2 * | 11/2019 | Andrade | H04L 63/0861 |
| 10,568,059 | B2 * | 2/2020 | Zhang | H04M 7/006 |
| 10,637,665 | B1 * | 4/2020 | Sundaresan | H04L 63/083 |
| 10,715,311 | B2 * | 7/2020 | Sundaresan | H04L 9/3226 |
| 10,715,312 | B2 * | 7/2020 | Sundaresan | H04L 9/30 |
| 10,841,097 | B2 * | 11/2020 | Davis | H04L 9/0637 |
| 11,088,855 | B2 * | 8/2021 | Sundaresan | H04L 9/3226 |
| 11,170,346 | B2 * | 11/2021 | Tummuru | H04L 9/3236 |
| 11,336,432 | B2 * | 5/2022 | Sundaresan | H04L 9/3271 |
| 11,924,163 | B2 * | 3/2024 | Shan | H04L 67/566 |
| 11,997,065 | B1 * | 5/2024 | Monti | H04L 67/52 |
| 12,452,075 | B2 * | 10/2025 | Alwar | G06Q 20/3829 |
| 2002/0077887 | A1 * | 6/2002 | London Shrader | G07C 13/00<br>705/12 |
| 2005/0177750 | A1 * | 8/2005 | Gasparini | G06F 21/31<br>726/5 |
| 2007/0155384 | A1 * | 7/2007 | Haran | H04L 63/10<br>455/434 |
| 2009/0100041 | A1 * | 4/2009 | Wilson | G06F 16/24<br>707/999.005 |
| 2009/0240795 | A1 * | 9/2009 | Tsirtsis | H04L 61/4511<br>709/223 |
| 2010/0191863 | A1 * | 7/2010 | Wing | H04L 61/2553<br>709/245 |
| 2012/0106488 | A1 * | 5/2012 | Nylander | H04L 61/4511<br>370/329 |
| 2012/0134319 | A1 * | 5/2012 | Kahn | H04W 8/26<br>370/328 |
| 2013/0096943 | A1 * | 4/2013 | Carey | G16B 50/40<br>705/2 |
| 2014/0068043 | A1 * | 3/2014 | Archbold | H04L 61/4511<br>709/223 |
| 2014/0089523 | A1 * | 3/2014 | Roy | H04L 61/4511<br>709/242 |
| 2015/0074290 | A1 * | 3/2015 | Rajamanickam | H04L 61/58<br>709/245 |
| 2015/0271031 | A1 * | 9/2015 | Beevers | G06F 16/29<br>709/224 |
| 2015/0281168 | A1 * | 10/2015 | Holloway | H04L 61/4511<br>709/245 |
| 2015/0324789 | A1 * | 11/2015 | Dvorak | H04L 9/3297<br>705/67 |
| 2016/0066261 | A1 * | 3/2016 | Nasielski | H04L 12/145<br>455/406 |
| 2016/0330174 | A1 * | 11/2016 | Sullivan | H04L 63/12 |
| 2016/0330185 | A1 * | 11/2016 | Morsing | H04L 61/4511 |
| 2017/0019371 | A1 * | 1/2017 | Osterweil | H04L 67/568 |
| 2017/0048235 | A1 * | 2/2017 | Lohe | G06Q 20/384 |
| 2017/0085555 | A1 * | 3/2017 | Bisikalo | G06Q 20/10 |
| 2017/0232300 | A1 * | 8/2017 | Tran | G06F 1/163<br>434/247 |
| 2017/0243209 | A1 * | 8/2017 | Johnsrud | H04M 15/854 |
| 2018/0013567 | A1 * | 1/2018 | Davis | H04L 9/0637 |
| 2018/0082256 | A1 * | 3/2018 | Tummuru | H04L 9/3297 |
| 2018/0117446 | A1 * | 5/2018 | Tran | G06F 1/163 |
| 2018/0248699 | A1 * | 8/2018 | Andrade | H04L 63/0861 |
| 2018/0268386 | A1 * | 9/2018 | Wack | G06Q 20/02 |
| 2019/0020620 | A1 * | 1/2019 | Byrne | H04L 61/4511 |
| 2019/0036680 | A1 * | 1/2019 | Sundaresan | H04L 9/30 |
| 2019/0036681 | A1 * | 1/2019 | Sundaresan | H04L 9/14 |
| 2019/0090286 | A1 * | 3/2019 | Vandikas | H04W 76/10 |
| 2019/0190724 | A1 * | 6/2019 | Sundaresan | H04L 9/3247 |
| 2020/0021559 | A1 * | 1/2020 | Kish | H04L 61/59 |
| 2020/0322131 | A1 * | 10/2020 | Sundaresan | H04L 9/14 |
| 2021/0075761 | A1 * | 3/2021 | Li | H04L 61/103 |
| 2021/0281537 | A1 * | 9/2021 | Zhang | H04L 67/1001 |
| 2021/0282083 | A1 * | 9/2021 | Mayyuri | H04L 43/10 |
| 2021/0314174 | A1 * | 10/2021 | Sundaresan | H04L 9/50 |
| 2022/0086182 | A1 * | 3/2022 | Maggioli | H04L 63/1433 |
| 2022/0239467 | A1 * | 7/2022 | Sundaresan | H04L 9/3226 |
| 2022/0286431 | A1 * | 9/2022 | Winn | H04L 61/4511 |
| 2022/0345443 | A1 * | 10/2022 | Gundavelli | H04W 24/04 |
| 2022/0417209 | A1 * | 12/2022 | Noldus | H04L 65/1104 |
| 2023/0062068 | A1 * | 3/2023 | Daviss | H04L 61/4511 |
| 2023/0370269 | A1 * | 11/2023 | Thai | H04L 9/3218 |
| 2024/0184523 | A1 * | 6/2024 | Wang | G06F 17/142 |
| 2024/0414524 | A1 * | 12/2024 | Speicher | H04W 48/08 |
| 2025/0030774 | A1 * | 1/2025 | Tonesi | H04L 67/51 |
| 2025/0119814 | A1 * | 4/2025 | Steben | H04W 8/26 |
| 2026/0032098 | A1 * | 1/2026 | Rosenbeck | H04L 61/4511 |

FOREIGN PATENT DOCUMENTS

| | | | | | |
|---|---|---|---|---|---|
| CA | 2975843 | A1 | * | 2/2018 | H04L 9/50 |
| CA | 2975843 | C | * | 6/2023 | H04L 63/0823 |
| CN | 1535451 | A | * | 10/2004 | H04L 9/0825 |
| CN | 102057724 | A | * | 5/2011 | H04W 48/20 |
| CN | 102056321 | B | * | 7/2014 | H04W 8/082 |
| CN | 104736696 | A | * | 6/2015 | C12N 9/001 |
| CN | 105847353 | A | * | 8/2016 | H04L 67/52 |
| CN | 107105472 | A | * | 8/2017 | H04W 48/17 |
| CN | 104662848 | B | * | 9/2017 | H04L 12/66 |
| CN | 105075193 | B | * | 5/2018 | H04L 12/6418 |
| CN | 108681587 | A | * | 10/2018 | |
| CN | 109887150 | A | * | 6/2019 | |
| CN | 111245967 | A | * | 6/2020 | H04L 61/4511 |
| CN | 107852650 | B | * | 1/2021 | H04W 48/16 |
| CN | 111245967 | B | * | 7/2022 | H04L 61/4511 |
| CN | 108681587 | B | * | 1/2023 | |
| CN | 116325695 | A | * | 6/2023 | H04L 61/4511 |
| CN | 116458137 | A | * | 7/2023 | H04L 61/4511 |
| CN | 118891931 | A | * | 11/2024 | H04W 48/18 |
| DE | 3827172 | A1 | * | 3/1989 | G11C 8/00 |
| DE | 102016220656 | A1 | * | 4/2018 | H04L 9/3239 |
| EP | 2709391 | A2 | * | 3/2014 | H04W 24/04 |
| EP | 2933986 | A1 | * | 10/2015 | H04L 61/4511 |
| EP | 1997026 | B1 | * | 8/2018 | H04L 61/4511 |
| EP | 3306900 | B1 | * | 5/2019 | H04L 63/0227 |
| JP | 5791766 | B2 | * | 10/2015 | H04W 8/26 |
| JP | 2019506103 | A | * | 2/2019 | H04L 9/3247 |
| JP | 2024543859 | A | * | 11/2024 | H04L 61/3025 |
| KR | 20090075365 | A | * | 7/2009 | G06K 7/0008 |
| KR | 100936893 | B1 | * | 1/2010 | G06K 7/10049 |
| KR | 20150114051 | A | * | 10/2015 | G06K 7/10039 |
| WO | WO-8901690 | A2 | * | 2/1989 | H04L 9/0836 |
| WO | WO-0173694 | A2 | * | 10/2001 | H04L 9/14 |
| WO | WO-02077929 | A2 | * | 10/2002 | H04L 9/0825 |
| WO | WO-03077473 | A1 | * | 9/2003 | G06Q 20/3263 |
| WO | WO-2007040451 | A1 | * | 4/2007 | H04W 36/10 |
| WO | WO-2007040452 | A1 | * | 4/2007 | H04W 12/08 |
| WO | WO-2009135531 | A1 | * | 11/2009 | H04W 60/04 |

(56) References Cited

FOREIGN PATENT DOCUMENTS

| | | | | | |
|---|---|---|---|---|---|
| WO | WO-2009150003 A1 | * | 12/2009 | ............ | H04W 48/20 |
| WO | WO-2010147524 A1 | * | 12/2010 | .............. | H04W 8/26 |
| WO | WO-2012100237 A2 | * | 7/2012 | ........... | G01S 13/878 |
| WO | WO-2013059368 A1 | * | 4/2013 | ........... | G06F 13/878 |
| WO | WO-2014030096 A2 | * | 2/2014 | ............. | C12N 9/001 |
| WO | WO-2014188233 A1 | * | 11/2014 | ............. | H04L 12/66 |
| WO | WO-2015117272 A1 | * | 8/2015 | ......... | H04L 12/6418 |
| WO | WO-2016015041 A1 | * | 1/2016 | ........... | H04L 9/0894 |
| WO | WO-2016201633 A1 | * | 12/2016 | ............ | H04W 48/16 |
| WO | WO-2017011601 A1 | * | 1/2017 | ............... | G09C 1/00 |
| WO | WO-2017066002 A1 | * | 4/2017 | ......... | G06F 16/1805 |
| WO | WO-2021158304 A1 | * | 8/2021 | .............. | H04W 4/06 |
| WO | WO-2022077246 A1 | * | 4/2022 | .......... | H04L 61/4511 |
| WO | WO-2022098500 A1 | * | 5/2022 | .......... | H04L 61/4511 |
| WO | WO-2022132116 A1 | * | 6/2022 | .............. | H04W 8/02 |
| WO | WO-2022240900 A1 | * | 11/2022 | .......... | H04L 61/4511 |
| WO | WO-2022266920 A1 | * | 12/2022 | ........... | G06F 17/142 |
| WO | WO-2023122429 A1 | * | 6/2023 | ............ | H04W 48/08 |
| WO | WO-2024036038 A1 | * | 2/2024 | .......... | H04L 61/4511 |
| WO | WO-2024107223 A1 | * | 5/2024 | ........... | H04L 9/0894 |

OTHER PUBLICATIONS

International Search Report and Written Opinion—PCT/US2022/081017—ISA/EPO—Feb. 16, 2023.

LG Electronics Inc: "Consideration on Xx Interface for Option 3/3a/3x", 3GPP TSG-RAN WG3 Meeting #95bis, R3-170944, 3rd Generation Partnership Project, Mobile Competence Centre, 650, Route Des Lucioles, F-06921 Sophia-Antipolis Cedex, France, vol. RAN WG3, No. Spokane, USA, Apr. 3, 2017-Apr. 7, 2017, Apr. 3, 2017, 2 Pages, XP051245672, Paragraphs [02.1], [02.2].

QUALCOMM Incorporated, et al., "Support for Handling Unknown Length of gNB Identifier [FLEX_gNB_Len] ", 3GPP TSG-RAN WG3 Meeting #113-e, R3-214404, 3rd Generation Partnership Project, Mobile Competence Centre, 650, Route Des Lucioles, F-06921 Sophia-Antipolis Cedex, France, vol. RAN WG3, No. Aug. 16, 2021-Aug. 26, 2021, Aug. 24, 2021, 4 Pages, XP052043555, The whole document.

QUALCOMM Incorporated: "On the Need for Explicit Signalling of gNB Length", 3GPP TSG-RAN WG3 Meeting AH-1801, R3-180101, 3rd Generation Partnership Project, Mobile Competence Centre, 650, Route Des Lucioles, F-06921 Sophia-Antipolis Cedex, vol. RAN WG3, No. Sophia Antipolis, France, Jan. 22, 20180Jan. 26, 2018, Jan. 12, 2018, 3 Pages, XP051387152, paragraph [02.2].

* cited by examiner

DETERMINING BASE STATION INTERNET PROTOCOL ADDRESS BASED ON VARIABLE LENGTH BASE STATION IDENTIFIER

CROSS-REFERENCE TO RELATED APPLICATIONS

This Patent Application is a 371 national stage of PCT Application No. PCT/US2022/081017 filed on Dec. 6, 2022, entitled "DETERMINING BASE STATION INTERNET PROTOCOL ADDRESS BASED ON VARIABLE LENGTH BASE STATION IDENTIFIER." which claims priority to Greece Patent Application Serial No. 20210100902, filed on Dec. 21, 2021, entitled "DETERMINING BASE STATION INTERNET PROTOCOL ADDRESS BASED ON VARIABLE LENGTH BASE STATION IDENTIFIER," and assigned to the assignee hereof. The disclosures of the prior Applications are considered part of and are incorporated by reference into this Patent Application.

FIELD OF THE DISCLOSURE

Aspects of the present disclosure generally relate to wireless communication and to techniques and apparatuses for determining a base station Internet Protocol (IP) address based on a variable length base station identifier.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a base station for wireless communication. The base station may include a memory and one or more processors coupled to the memory. The one or more processors may be configured to receive a cell identifier associated with a neighboring base station. The one or more processors may be configured to transmit, to a domain name system (DNS) server, a query constructed based at least in part on reversing a set of bits in the cell identifier. The one or more processors may be configured to receive, from the DNS server and based at least in part on the query, an Internet Protocol (IP) address associated with the neighboring base station.

Some aspects described herein relate to a method of wireless communication performed by a base station. The method may include receiving a cell identifier associated with a neighboring base station. The method may include transmitting, to a DNS server, a query constructed based at least in part on reversing a set of bits in the cell identifier. The method may include receiving, from the DNS server and based at least in part on the query, an IP address associated with the neighboring base station.

Some aspects described herein relate to a non-transitory computer-readable medium that stores a set of instructions for wireless communication by a base station. The set of instructions, when executed by one or more processors of the base station, may cause the base station to receive a cell identifier associated with a neighboring base station. The set of instructions, when executed by one or more processors of the base station, may cause the base station to transmit, to a DNS server, a query constructed based at least in part on reversing a set of bits in the cell identifier. The set of instructions, when executed by one or more processors of the base station, may cause the base station to receive, from the DNS server and based at least in part on the query, an IP address associated with the neighboring base station.

Some aspects described herein relate to an apparatus for wireless communication. The apparatus may include means for receiving a cell identifier associated with a base station. The apparatus may include means for transmitting, to a DNS server, a query constructed based at least in part on reversing a set of bits in the cell identifier. The apparatus may include means for receiving, from the DNS server and based at least in part on the query, an IP address associated with the base station.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
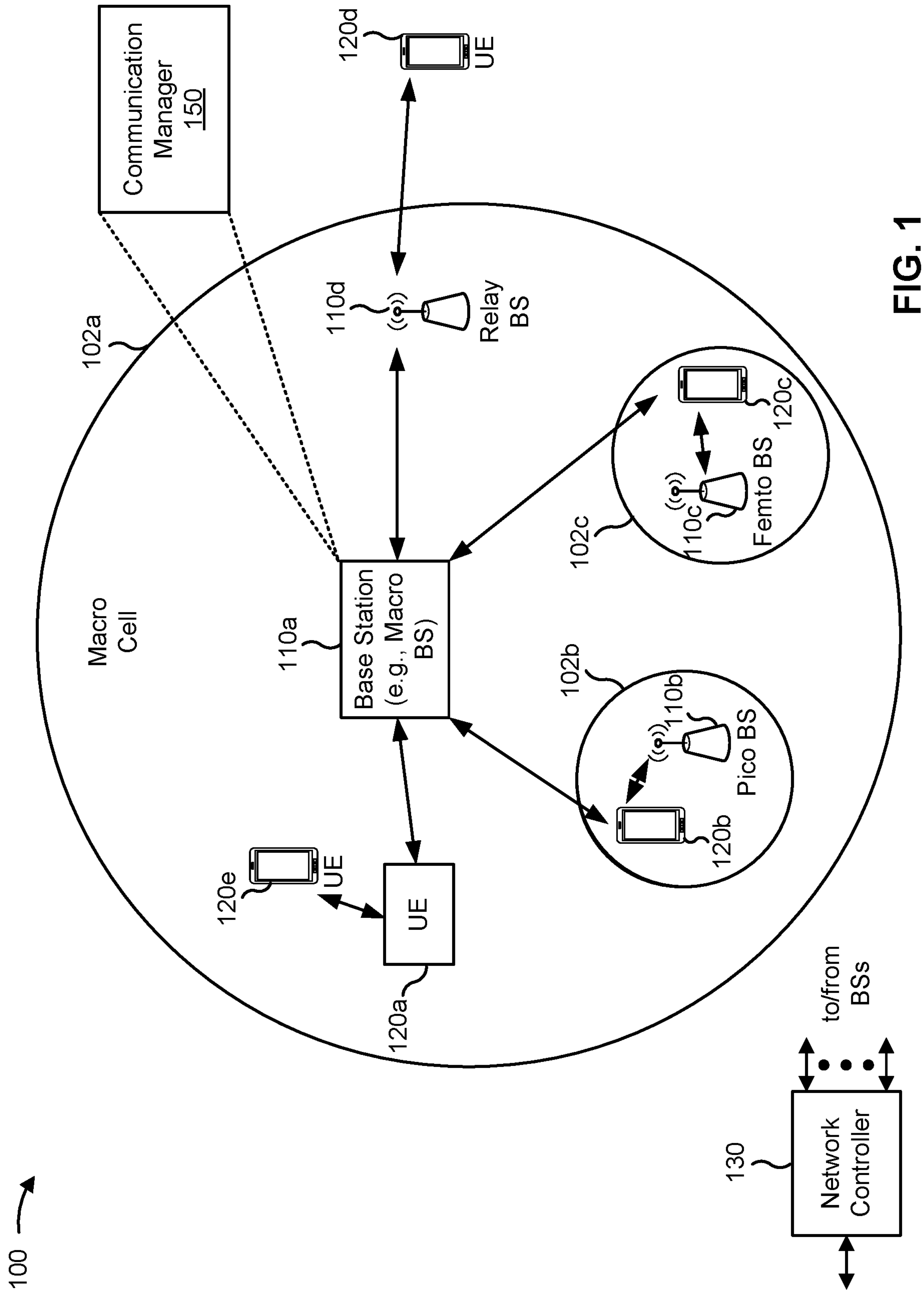
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS **110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*c*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110** and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHZ" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a. FR4-1, and/or FR5) may be modified, and techniques described herein are applicable to those modified frequency ranges.

In some aspects, the base station 110 may include a communication manager 150. As described in more detail elsewhere herein, the communication manager 150 may receive a cell identifier associated with a neighboring base station: transmit, to a domain name system (DNS) server, a query constructed based at least in part on reversing a set of bits in the cell identifier; and receive, from the DNS server and based at least in part on the query, an Internet Protocol (IP) address associated with the neighboring base station. Additionally, or alternatively, the communication manager 150 may perform one or more other operations described herein.

As indicated above. FIG. 1 is provided as an example. Other examples may differ from what is described with regard to FIG. 1.

Figure 2:
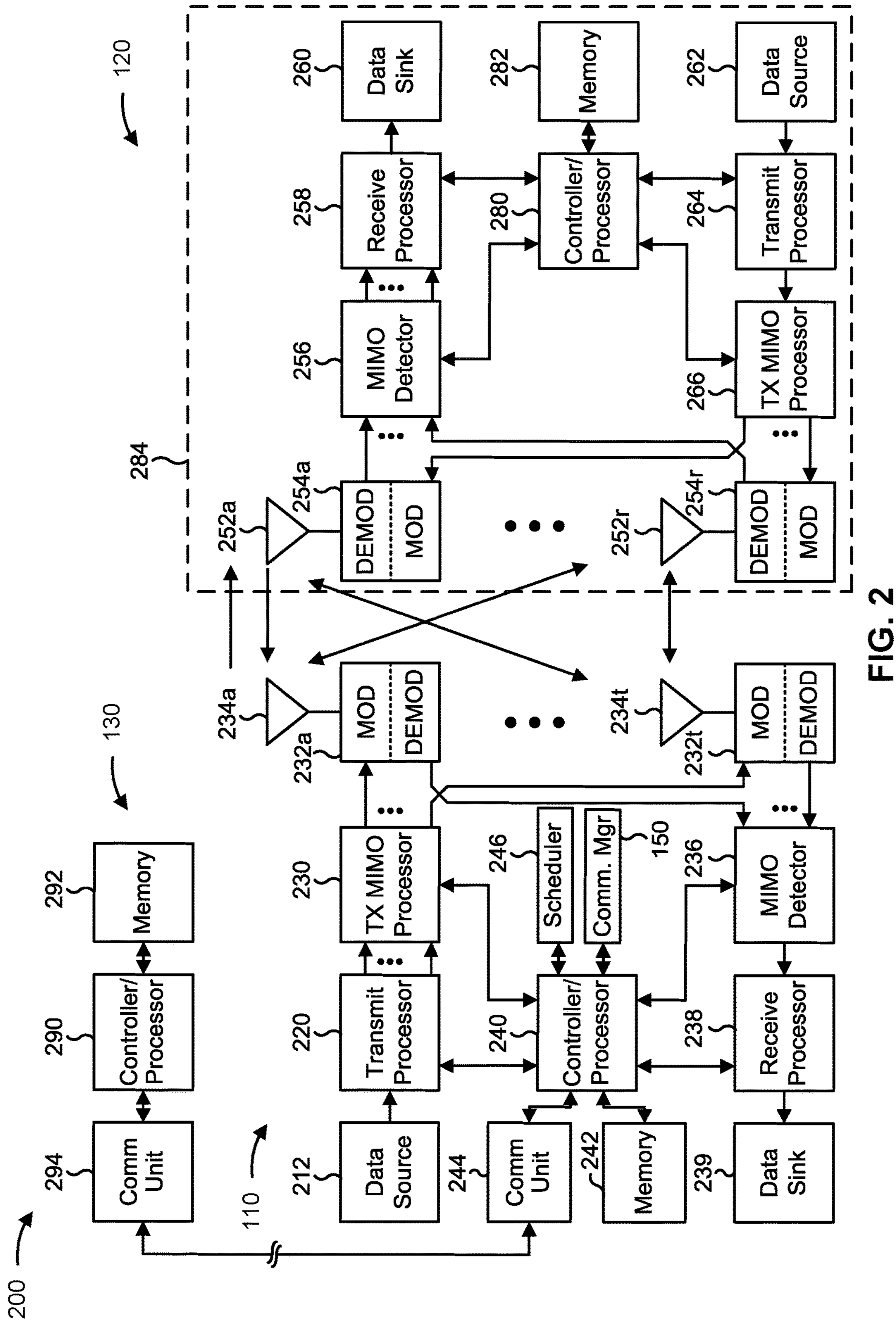
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T' antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g. T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of noncoplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3A, 3B, 4, and 5).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3A, 3B, 4, and 5).

The controller/processor 240 of the base station 110, the controller/processor 280 of the UE 120, and/or any other component(s) of FIG. 2 may perform one or more techniques associated with determining a base station IP address based on a variable length base station identifier, as described in more detail elsewhere herein. For example, the controller/processor 240 of the base station 110, the controller/processor 280 of the UE 120, and/or any other component(s) of FIG. 2 may perform or direct operations of, for example, process 400 of FIG. 4, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, and/or other processes as described herein. In some examples, executing instructions may include running the instructions, converting the instructions, compiling the instructions, and/or interpreting the instructions, among other examples.

In some aspects, the base station 110 includes means for receiving a cell identifier associated with a neighboring base station: means for transmitting, to a DNS server, a query constructed based at least in part on reversing a set of bits in the cell identifier; and/or means for receiving, from the DNS server and based at least in part on the query, an IP address associated with the neighboring base station. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above. FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. “Network entity” or “network node” may refer to a disaggregated base station, or to one or more units of a disaggregated base station (such as one or more central units (CUs), one or more distributed units (DUs), one or more radio units (RUs), or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an integrated access and backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

In some cases, base stations (e.g., gNBs) may be dynamically added to an NR (e.g., 5G) network, and in such cases, managing relationships between neighboring base stations may be challenging. In some examples, base stations (e.g., mobile relay gNBs) may be deployed in an NR network. For example, relay base stations (e.g., gNBs) may be mounted on vehicles and may move to different locations. In this case, as the mobile base stations are moving, their relationships with neighboring base stations may be constantly changing. In some examples, base stations (e.g., gNBs) may be deployed to provide coverage for a small cell (e.g., a femto cell, a pico cell, or the like). For example, small cell base stations (e.g., gNBs) may be deployed to enhance indoor coverage in one or more buildings. In this case managing neighbor relationships of base stations with a large number of small cells may be challenging, and manual configuration of the neighbor relationships may be impractical.

In some examples, managing neighbor relationships may include a base station determining an IP address of a neighboring base station (e.g., gNB) in order to establish an Xn interface between the base station and the neighboring base station. "Neighboring base station" may refer to a base station in an adjacent cell and/or overlapping cell to a cell associated with a particular base station. In 4G/LTE, a base station may determine the IP address of a neighboring base station (e.g., eNB) by constructing a fully qualified domain name (FQDN) using an eNB identifier (eNB ID) associated with the neighboring eNB. The CNB ID is included in a cell identifier (e.g., an Evolved Universal Mobile Telecommunications System (UMTS) Terrestrial Radio Access Network (E-UTRAN) cell identity (ECI)) that is broadcasted by each eNB. However, such an FQDN for determining the IP address based on a global identifier of a base station (e.g., a gNB) has not been defined for NR. Furthermore, the FQDN constructed for an eNB (e.g., in 4G/LTE) may not be applied to a gNB because the identifier of a gNB (e.g., gNB identity (gNB ID)) is defined differently than the eNB ID.

The Global gNB ID is an information element (IE) used to globally identify a gNB. The Global gNB ID includes a public land mobile network (PLMN) identifier (e.g., that includes a mobile country code (MCC) and a mobile network code (MNC)) and the gNB ID. The 3GPP standard (e.g., technical specification (TS) 38.413) defines the gNB ID as equal to the leftmost bits of the NR cell identity (NR cell ID). However, in 5G, the gNB ID has a variable size (e.g., 22-32 bits), and there is no mechanism specified for how a gNB can derive the gNB ID from a 36 bit NR cell ID broadcast by another gNB. For example, due to the variable size of the gNB ID, a base station (e.g. gNB) may not know which bits in the NR cell ID broadcast by a neighboring base station (e.g. gNB) indicate the gNB ID of the neighboring base station. As a result, the base station may not be able to determine an IP address of the neighboring base station, and therefore may not be able to establish the Xn interface for communications with the neighboring base station.

Some techniques and apparatuses described herein enable a base station to determine an IP address of a neighboring base station based on a variable length base station identifier (e.g., gNB ID) associated with the neighboring base station. The base station may receive a cell identifier (e.g., an NR cell ID) associated with the neighboring base station. The base station may transmit, to a DNS server, a query constructed based at least in part on reversing a set of bits in the cell identifier. The base station may receive, from the DNS server and based at least in part on the query, an IP address associated with the neighboring base station. The IP address may be associated with a DNS resource record that includes the base station ID (e.g., the gNB ID) for the neighboring base station. The resource record may be configured with a wildcard character preceding the base station identifier for the neighboring base station, such that the DNS server resolves any query including additional bits preceding the base station identifier for the neighboring base station to the DNS resource record associated with the IP address for the neighboring base station. In this way, by constructing the query based at least in part on reversing the set of bits in the cell identifier, the base station may construct a query that resolves to the IP address for the neighboring base station without prior knowledge of which bits in the cell identifier (e.g., the NR cell ID) are used to indicate the base station identifier (e.g., the gNB ID) for the neighboring base station. As a result, the base station may establish an Xn interface between the base station and the neighboring base station, and the base station may communicate with the neighboring base station over the Xn interface.

Figure 3A:
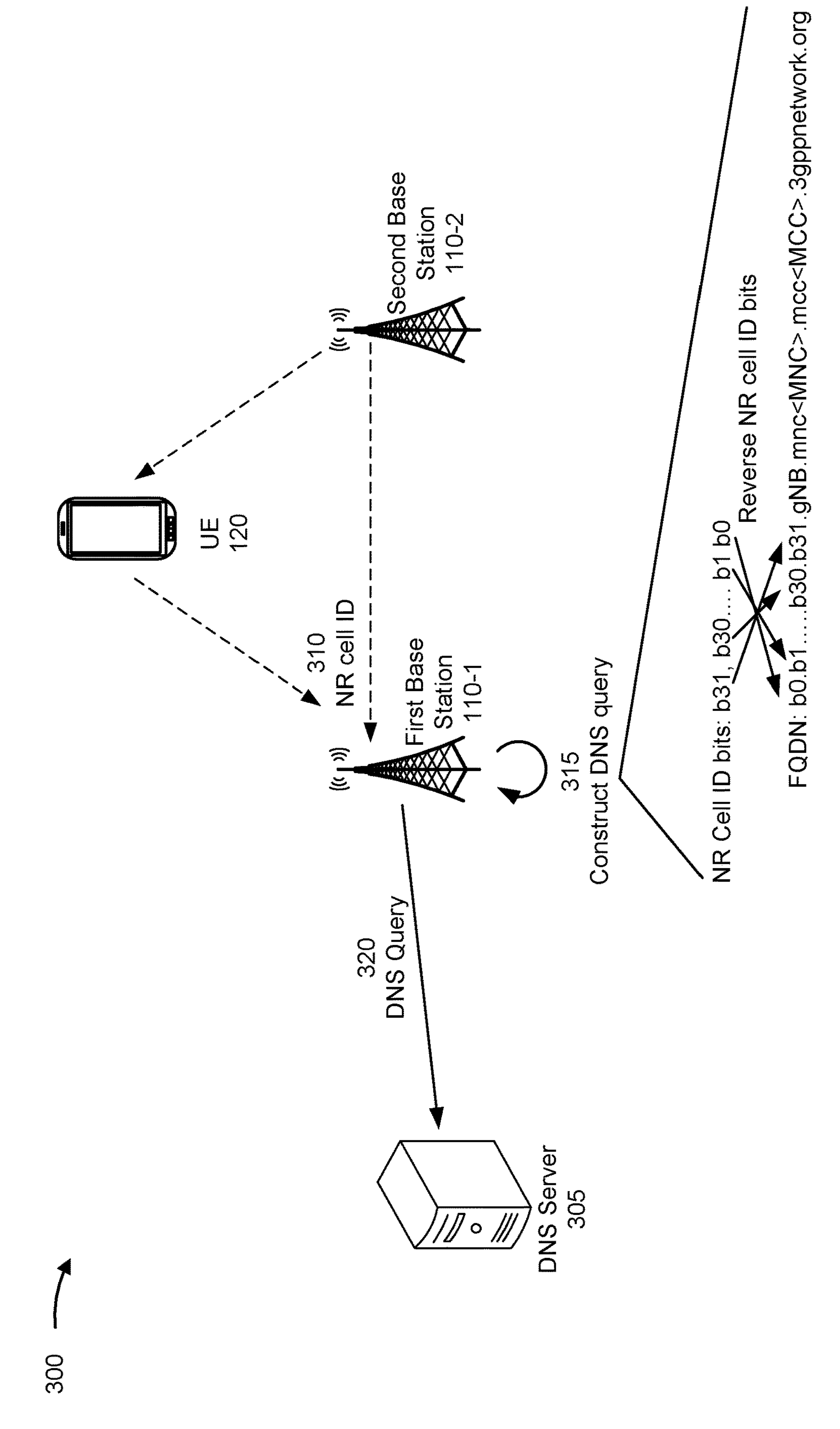
FIGS. 3A-3B are diagrams illustrating an example associated with determining a base station Internet Protocol (IP) address based on a variable length base station identifier, in accordance with the present disclosure.
Figure 3B:
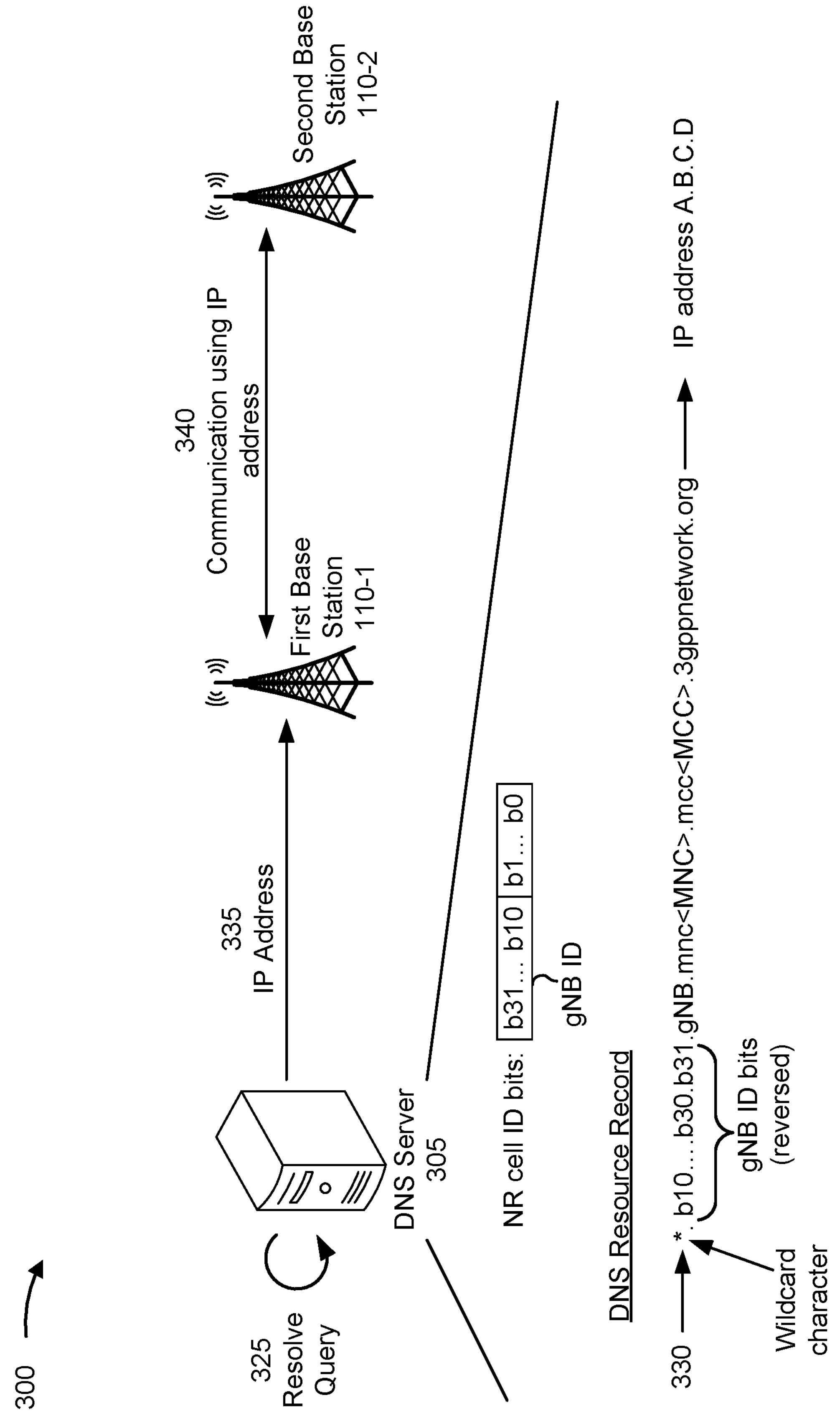

FIGS. 3A-3B are diagrams illustrating an example 300 associated with determining a base station IP address based on a variable length base station identifier, in accordance with the present disclosure. As shown in FIG. 3A, example 300 includes communication between a first base station 110-1, a second base station 110-2, a UE 120, and a DNS server 305. In some aspects, the first base station 110-1, the second base station 110-2, and the UE 120 may be included in a wireless network, such as wireless network 100. In some aspects, the first base station 110-1 may be a first gNB (e.g., a first 5G/NR base station), the second base station 110-2 may be a second gNB (e.g., a second 5G/NR base station), and the wireless network may be a 5G/NR wireless network.

The DNS server 305 may include one or more devices capable of receiving, generating, storing, processing, providing, and/or routing information. The DNS server 305 may include one or more computing devices. For example, the DNS server 305 may include on or more computing devices in a distributed database system.

As shown in FIG. 3A, and by reference number 310, the first base station 110-1 may receive a cell identifier associated with the second base station 110-2. In some aspects, the second base station 110-2 may be a neighboring base station to the first base station 110-1. In some aspects, the cell identifier may be an NR cell ID broadcast by the second base station 110-2. In some aspects, the first base station 110-1 may receive the broadcast including the NR cell ID from the second base station 110-2. In some aspects, the broadcast from the second base station 110-2 may include an NR cell global ID that includes the MCC, the MNC, and the NR cell ID. In some aspects, the first base station 110-1 may receive the NR cell ID associated with the second base station 110-2 from the UE 120. For example, the UE 120 may be in a cell associated with the first base station 110-1 and an adjacent cell may be associated with the second base station 110-2. The UE 120 may receive the broadcast of the NR cell ID from the second base station 110-2, and the UE 120 may report (e.g., transmit) the NR cell ID associated with the neighboring cell to the first base station 110-1. In some aspects, the first base station 110-1 may receive, from the UE 120, the NR cell ID, the PLMN ID (e.g., including the MCC, the MNC) broadcast by the second base station 110-2.

As further shown in FIG. 3A, and by reference number 315, the first base station 110-1 may construct a DNS query from a set of bits included in the cell identifier (e.g., the NR cell ID) associated with the second base station 110-2 (e.g., the neighboring base station). In some aspects, the cell identifier may be a 36 bit NR cell ID. A base station identifier (e.g., gNB ID) may be included in the cell identifier (e.g., the NR cell ID). In some aspects, the base station identifier may be a gNB ID. For example, the gNB ID may be defined (e.g., in a wireless communication standard) as the n leftmost (e.g., highest order) bits of the NR cell ID IE with a variable size (e.g., n=22-32 bits).

In some aspects, the first base station 110-1 may construct the DNS query based at least in part on reversing a set of bits included in the cell identifier (e.g., the NR cell ID). The set of bits, in the NR cell ID, that is reversed by the first base station 110-1 may be referred to as the "NR cell ID bits." In some aspects, the NR cell ID bits (e.g., the set bits in the NR cell ID that is reversed) may include all of the bits in the NR cell ID (e.g., all 36 bits in the NR cell ID). In some aspects, as shown in FIG. 3A, the NR cell ID bits (e.g., the set of bits in the NR cell ID that are reversed) may include a subset of bits in the NR cell ID the NR cell ID having a quantity associated with a maximum number of bits for the base station identifier (e.g., the gNB ID) included in the NR cell ID. For example, in a case in which the gNB ID can be 22-32 bits, the NR cell ID bits that are reversed may include 32 bits of the 36 bits in the NR cell ID. In this case, the NR cell ID bits may include the 32 leftmost (e.g., highest order bits) in the NR cell ID, in order to ensure that the full gNB ID is included in the set of bits that is reversed by the first base station 110-1.

In some aspects, the query may include an FQDN, and the first base station 110-1 may construct the FQDN by reversing the NR cell ID bits (e.g., the full set of bits in the NR cell ID or the quantity of bits associated with the maximum number of bits in the gNB ID), such that the FQDN includes the NR cell ID bits in a reverse order from the NR cell ID. For example, as shown in FIG. 3A, the NR cell ID bits may include 32 bits: b31, b30 . . . , b1, b0. The first base station 110-1 may construct the FQDN by reversing the 32 bits in the set of NR cell ID bits, such that the 32 bits are in the reverse order (e.g., b0.b01 . . . b30.b31) in the FQDN. As shown in FIG. 3A, the FQDN may also include the MNC and the MCC included in the NR cell global ID. For example, the first base station 110-1 may generate the FQDN as follows: b0.b1 . . . b30.b31.gNB.mnc<MNC>.mcc<MCC>.3gppnetwork.org.

As further shown in FIG. 3A, and by reference number 320, the first base station 110-1 may transmit the DNS query to the DNS server 305. The DNS query may include the FQDN that includes the reversed set of bits from the cell identifier (e.g., the reversed NR cell ID bits).

As shown in FIG. 3B, and by reference number 325, the DNS server may resolve the DNS query received from the first base station 110-1. In some aspects, the DNS server may be configured with wildcard A/AAAA DNS resource records to catch all sub-domains beyond the actual length of the base station identifiers (e.g., gNB IDs) associated with the DNS resource records. The DNS resource records may be associated with respective IP addresses. For example, an IP address of the second base station 110-2 may be associated with a DNS resource record that is associated with the base station identifier (e.g., the gNB ID) for the second base station 110-2.

In some aspects, the DNS resource record associated with the IP address of the second base station 110-2 may include the base station identifier (e.g., with the bits in the reverse order from the NR cell ID) associated with the second base station 110-2, and the DNS resource record may be configured with a wildcard preceding the base station identifier associated with the second base station 110-2. The DNS query received from the first base station 110-1 may include the FQDN that includes (e.g., in a reversed order from the NR cell ID) all of the bits in the NR cell ID or a quantity of bits in the NR cell ID associated with the maximum number (e.g., 32 bits) for the gNB ID. In this way, the FQDN may always include at least the full gNB ID for the second base station 110-2, and may also include extra bits preceding the gNB ID bits (due to first base station 110-1 reversing the bits in the FQDN). In some aspects, the DNS server may automatically select the longest match (e.g., a DNS resource record with the longest matching FQDN after the wildcard character) for a received query, and the wildcard sub-domain may ensure that the same IP address is returned for all queries that include at least the base station identifier (e.g., the gNB ID) of the second base station 110-2 (e.g., regardless of any extra bits preceding the gNB ID). In this case, the DNS server 305 may ignore any bits beyond the actual length of the NR cell IDs in a given network (e.g., any bits preceding the gNB ID bits in the query). For example, due to the wildcard character preceding the base station identifier (e.g., the gNB ID) for the second base station 110-2, the DNS record associated with the IP address for the second base station 110-2 may match with the query received from the first base station 110-1 based at least in part on a subset of bits in the query that includes the base station identifier. A DNS resource record may be considered to match with a query, if the DNS server 305 resolves the query to the IP address associated with that DNS resource record.

As shown in example 300 of FIG. 3B, the gNB ID associated with the second base station 110-2 may use 22 bits. For example, the mobile network operator (MNO) associated with the second base station 110-2 may use 22 bit gNB IDs for base stations associated with that MNO. In this example, the NR cell ID bits (e.g., the set of bits in the NR cell ID that is reversed in the FQDN) may include 32 bits (b31 . . . b0). In this case, a subset of 22 bits (b31, . . . , b10), of the set of NR cell ID bits, may include the gNB ID associated with the second base station 110-2. As shown by reference number 330, the DNS resource record associated with the IP address for the second base station 110-2 (e.g., A.B.C.D in FIG. 3B) may include gNB bits (e.g., the subset of 22 bits that include the gNB ID) from the NR cell ID in the reverse order (b10 . . . b30.b31) from the NR cell ID, and the DNS resource record may be configured with a wildcard character ("*") preceding the gNB bits. The DNS record may also include the rest of the FQDN constructed for the second base station 110-2, following the gNB ID bits, as described above in connection with FIG. 3A. For example, in a case in which a 22 bit gNB ID for the base station is 1111 0000 1111 0000 1111 00, a DNS A resource record configured for the second base station 110-2 may be:

*. 0.0.1.1.1.1.0.0.0.0.1.1.1.1.0.0.0.0.1.1.1.1.gNB.mnc<MNC>.mcc<MCC>0.3gppnetwork.org."

In example 300, the DNS server 305 may receive the FQDN that includes the reversed set of NR cell ID bits (b0 . . . b31), and the DNS server 305 may determine that the FQDN matches with the DNS resource record (*.b10 . . . b31) based at least in part on a match between the subset of NR cell bits (.b10 . . . b31) in the FQDN and the DNS resource record, and the wildcard character preceding the matching subset of NR cell bits. Based at least in part on determining that the query matches with the DNS resource record, the DNS server 305 may resolve the query to the IP address (e.g., A.B.C.D) associated with the second base station 110-2 (e.g., the neighboring base station).

As further shown in FIG. 3B, and by reference number 335, the DNS server 305 may transmit, to the first base station 110-1, the IP address associated with the second base station 110-2 (e.g., the neighboring base station). The DNS server 305 may transmit the IP address associated with the second base station 110-2, and the first base station 110-1 may receive the IP address associated with the second base station 110-2, based at least in part on the DNS query transmitted by the second base station 110-2 to the DNS server 305.

As further shown in FIG. 3B, and by reference number 340, the first base station 110-1 may communicate with the second base station 110-2 (e.g., the neighboring base station) using the IP address associated with the second base station 110-2. In some aspects, the first base station 110-1 may establish an Xn interface between the first base station 110-1 and the second base station 110-2 using the IP address of the second base station 110-2, and the first base station 110-1 may communicate with the second base station 110-2 via the Xn interface. For example, the first base station 110-1 may transmit communications to the second base station 110-2 and/or receive communications from the second base station 110-2 via the Xn interface. In some aspects, the first base station 110-1 may communicate with the second base station 110-2 to trigger a handover of a UE (e.g., the UE 120) from the cell associated with the first base station 110-1 to the neighboring cell associated with second base station 110-2, or to trigger a handover of a UE (e.g., the UE 120) from the cell associated with the second base station 110-2 to the cell associated with the first base station 110-1.

As described above, the first base station 110-1 may receive a cell identifier (e.g., an NR cell ID) associated with the second base station 110-2 (e.g., a neighboring base station). The first base station 110-1 may transmit, to the DNS server 305, a query constructed based at least in part on reversing a set of bits in the cell identifier. The first base station 110-1 may receive, from the DNS server 305 and based at least in part on the query, an IP address associated with the second base station 110-2. The IP address may be associated with a DNS resource record that includes the base station ID (e.g., the gNB ID) for the second base station 110-2. The resource record may be configured with a wildcard character preceding the base station identifier for the second base station 110-2, such that the DNS server 305 resolves any query including additional bits preceding the base station identifier for the second base station 110-2 to the DNS resource record associated with the IP address for the second base station 110-2. In this way, by constructing the query based at least in part on reversing the set of bits in the cell identifier, the first base station 110-1 may construct a query that resolves to the IP address for the second base station 110-2 without prior knowledge of which bits in the cell identifier (e.g., the NR cell ID) are used to indicate the base station identifier (e.g., the gNB ID) for the second base station 110-2. As a result, the first base station 110-1 may establish an Xn interface between the first base station 110-1 and the neighboring second base station 110-2, and the first base station 110-1 may communicate with the second base station 110-2 over the Xn interface.

As indicated above, FIGS. 3A-3B are provided as an example. Other examples may differ from what is described with respect to FIGS. 3A-3B.

Figure 4:
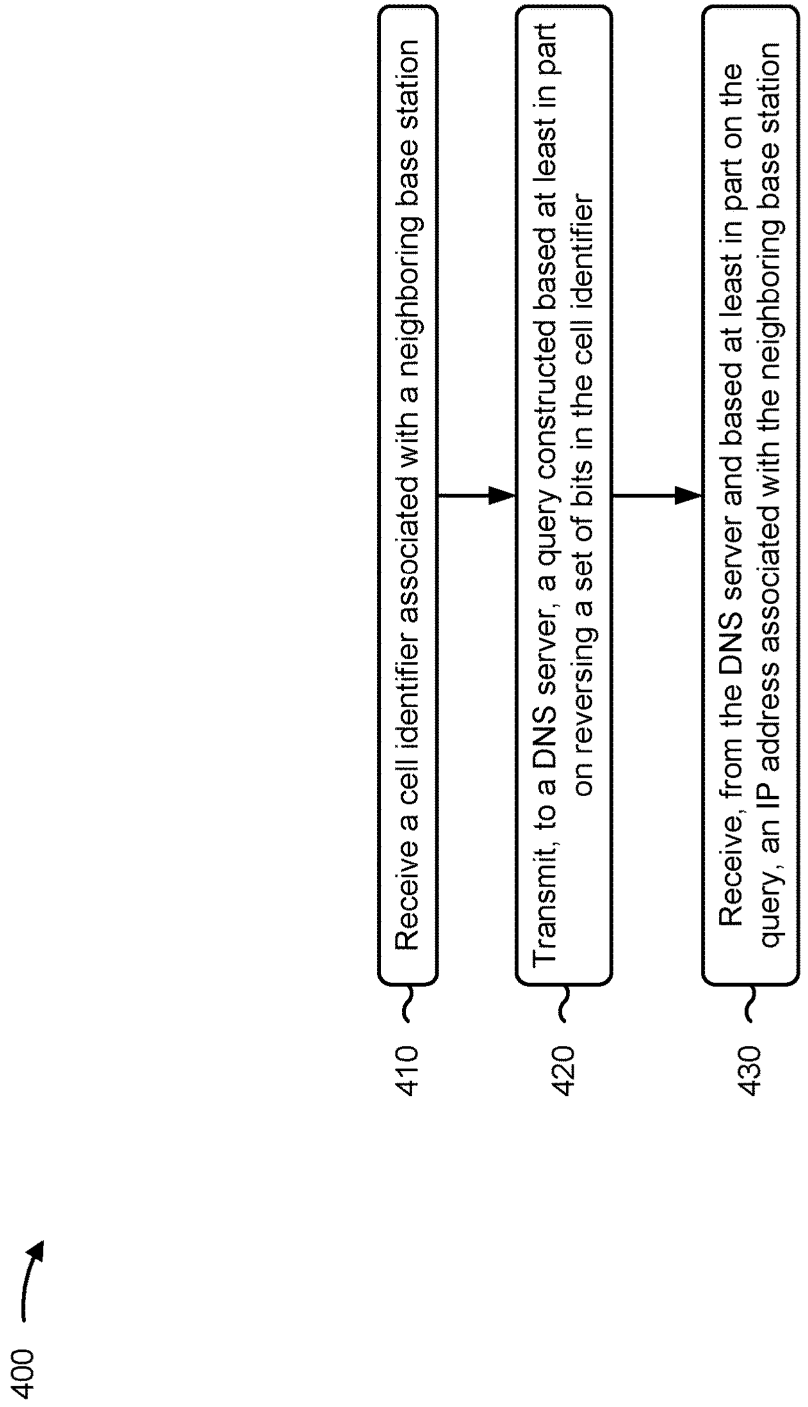
FIG. 4 is a diagram illustrating an example process associated with determining a base station IP address based on a variable length base station identifier, in accordance with the present disclosure.

FIG. 4 is a diagram illustrating an example process 400 performed, for example, by a base station, in accordance with the present disclosure. Example process 400 is an example where the base station (e.g., base station 110) performs operations associated with determining a base station IP address based on a variable length base station identifier.

As shown in FIG. 4, in some aspects, process 400 may include receiving a cell identifier associated with a neighboring base station (block 410). For example, the base station (e.g., using communication manager 150 and/or reception component 502, depicted in FIG. 5) may receive a cell identifier associated with a neighboring base station, as described above.

As further shown in FIG. 4, in some aspects, process 400 may include transmitting, to a DNS server, a query constructed based at least in part on reversing a set of bits in the cell identifier (block 420). For example, the base station (e.g., using communication manager 150 and/or transmission component 504, depicted in FIG. 5) may transmit, to a DNS server, a query constructed based at least in part on reversing a set of bits in the cell identifier, as described above.

As further shown in FIG. 4, in some aspects, process 400 may include receiving, from the DNS server and based at least in part on the query, an IP address associated with the neighboring base station (block 430). For example, the base station (e.g., using communication manager 150 and/or reception component 502, depicted in FIG. 5) may receive, from the DNS server and based at least in part on the query, an IP address associated with the neighboring base station, as described above.

Process 400 may include additional aspects, such as any single aspect or any combination of aspects described below and/or in connection with one or more other processes described elsewhere herein.

In a first aspect, a subset of bits, of the set of bits in the cell identifier, includes a base station identifier for the neighboring base station.

In a second aspect, alone or in combination with the first aspect, the cell identifier is an NR cell ID, and the base station identifier is a gNB ID.

In a third aspect, alone or in combination with one or more of the first and second aspects, receiving the IP address associated with the neighboring base station includes receiving, from the DNS server, an IP address associated with a DNS resource record that includes the base station identifier for the neighboring base station.

In a fourth aspect, alone or in combination with one or more of the first through third aspects, the DNS resource record is configured with a wildcard character preceding the base station identifier for the neighboring base station, such that the DNS resource record matches with the query based at least in part on the subset of bits that includes the base station identifier.

In a fifth aspect, alone or in combination with one or more of the first through fourth aspects, the query includes an FQDN that includes the set of bits in the cell identifier, in a reverse order from that of the cell identifier.

In a sixth aspect, alone or in combination with one or more of the first through fifth aspects, the set of bits includes a full quantity of bits included in the cell identifier.

In a seventh aspect, alone or in combination with one or more of the first through sixth aspects, the set of bits includes a quantity of bits included in the cell identifier, and the quantity is associated with a maximum number of bits for a base station identifier included in the cell identifier.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
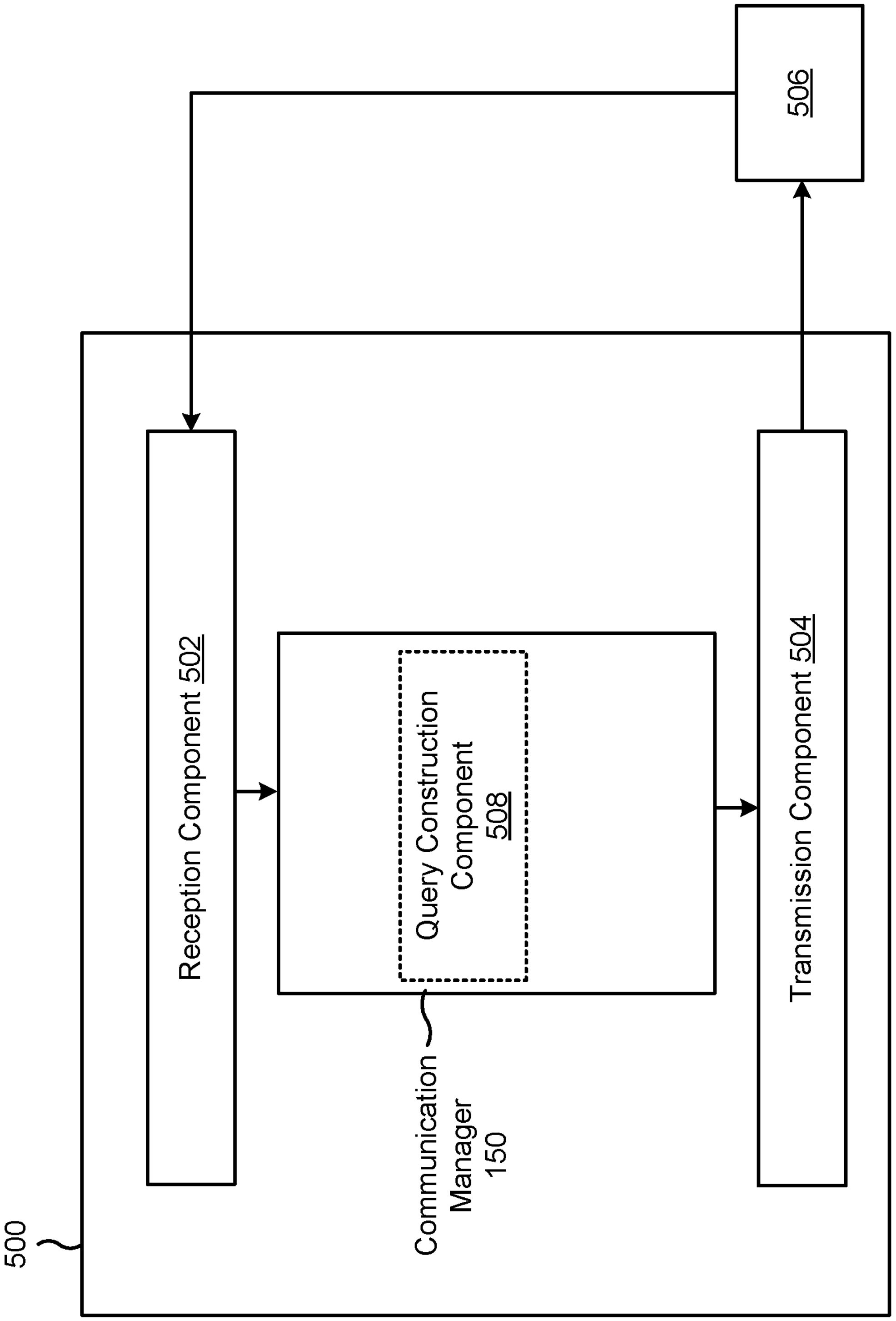
FIG. 5 is a diagram of an example apparatus for wireless communication, in accordance with the present disclosure.

FIG. 5 is a diagram of an example apparatus 500 for wireless communication. The apparatus 500 may be a base station, or a base station may include the apparatus 500. In some aspects, the apparatus 500 includes a reception component 502 and a transmission component 504, which may be in communication with one another (for example, via one or more buses and/or one or more other components). As shown, the apparatus 500 may communicate with another apparatus 506 (such as a UE, a base station, or another wireless communication device) using the reception component 502 and the transmission component 504. As further shown, the apparatus 500 may include the communication manager 150. The communication manager 150 may a query construction component 508.

In some aspects, the apparatus 500 may be configured to perform one or more operations described herein in connection with FIGS. 3A-3B. Additionally, or alternatively, the apparatus 500 may be configured to perform one or more processes described herein, such as process 400 of FIG. 4, or a combination thereof. In some aspects, the apparatus 500 and/or one or more components shown in FIG. 5 may include one or more components of the base station described in connection with FIG. 2. Additionally, or alternatively, one or more components shown in FIG. 5 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 502 may receive communications, such as reference signals, control information, data communications, or a combination thereof, from the apparatus 506. The reception component 502 may provide received communications to one or more other components of the apparatus 500. In some aspects, the reception component 502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 500. In some aspects, the reception component 502 may include one or more antennas, a modem, a demodulator, a MIMO detector, a receive processor, a controller/processor, a memory, or a combination thereof, of the base station described in connection with FIG. 2.

The transmission component 504 may transmit communications, such as reference signals, control information, data communications, or a combination thereof, to the apparatus 506. In some aspects, one or more other components of the apparatus 500 may generate communications and may provide the generated communications to the transmission component 504 for transmission to the apparatus 506. In some aspects, the transmission component 504 may perform signal processing on the generated communications (such as filtering, amplification, modulation, digital-to-analog conversion, multiplexing, interleaving, mapping, or encoding, among other examples), and may transmit the processed signals to the apparatus 506. In some aspects, the transmission component 504 may include one or more antennas, a modem, a modulator, a transmit MIMO processor, a transmit processor, a controller/processor, a memory, or a combination thereof, of the base station described in connection with FIG. 2. In some aspects, the transmission component 504 may be co-located with the reception component 502 in a transceiver.

The reception component 502 may receive a cell identifier associated with a neighboring base station. The transmission component 504 may transmit, to a DNS server, a query constructed based at least in part on reversing a set of bits in the cell identifier. The reception component 502 may receive, from the DNS server and based at least in part on the query, an IP address associated with the neighboring base station.

The query construction component 508 may construct the query based at least in part on reversing the set of bits in the cell identifier.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of (one or more) components shown in FIG. 5 may perform one or more functions described as being performed by another set of components shown in FIG. 5.

The following provides an overview of some Aspects of the present disclosure:

Aspect 1: A method of wireless communication performed by a base station, comprising: receiving a cell identifier associated with a neighboring base station: transmitting, to a domain name system (DNS) server, a query constructed based at least in part on reversing a set of bits in the cell identifier; and receiving, from the DNS server and based at least in part on the query, an Internet Protocol (IP) address associated with the neighboring base station.

Aspect 2: The method of Aspect 1, wherein a subset of bits, of the set of bits in the cell identifier, includes a base station identifier for the neighboring base station.

Aspect 3: The method of Aspect 2, wherein the cell identifier is an NR cell identity (ID), and wherein the base station identifier is a gNB ID.

Aspect 4: The method of any of Aspects 2-3, wherein receiving the IP address associated with the neighboring base station comprises: receiving, from the DNS server, an IP address associated with a DNS resource record that includes the base station identifier for the neighboring base station.

Aspect 5: The method of Aspect 4, wherein the DNS resource record is configured with a wildcard character preceding the base station identifier for the neighboring base station, such that the DNS resource record matches with the query based at least in part on the subset of bits that includes the base station identifier.

Aspect 6: The method of any of Aspects 1-5, wherein the query includes a fully qualified domain name (FQDN) that includes the set of bits in the cell identifier, in a reverse order from that of the cell identifier.

Aspect 7: The method of Aspect 6, wherein the set of bits includes a full quantity of bits included in the cell identifier.

Aspect 8: The method of Aspect 6, wherein the set of bits includes a quantity of bits included in the cell identifier, and wherein the quantity is associated with a maximum number of bits for a base station identifier included in the cell identifier.

Aspect 9: An apparatus for wireless communication at a device, comprising a processor: memory coupled with the processor; and instructions stored in the memory and executable by the processor to cause the apparatus to perform the method of one or more of Aspects 1-8.

Aspect 10: A device for wireless communication, comprising a memory and one or more processors coupled to the memory, the one or more processors configured to perform the method of one or more of Aspects 1-8.

Aspect 11: An apparatus for wireless communication, comprising at least one means for performing the method of one or more of Aspects 1-8.

Aspect 12: A non-transitory computer-readable medium storing code for wireless communication, the code comprising instructions executable by a processor to perform the method of one or more of Aspects 1-8.

Aspect 13: A non-transitory computer-readable medium storing a set of instructions for wireless communication, the set of instructions comprising one or more instructions that, when executed by one or more processors of a device, cause the device to perform the method of one or more of Aspects 1-8.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A base station for wireless communication, comprising:

a memory; and one or more processors, coupled to the memory, configured to:

receive a cell identifier associated with a neighboring base station;

transmit, to a domain name system (DNS) server, a query constructed based at least in part on reversing a set of bits in the cell identifier; and receive, from the DNS server and based at least in part on the query, an Internet Protocol (IP) address associated with the neighboring base station.

2. The base station of claim 1, wherein a subset of bits, of the set of bits in the cell identifier, includes a base station identifier for the neighboring base station.

3. The base station of claim 2, wherein the cell identifier is an New Radio (NR) cell identity (ID), and wherein the base station identifier is a gNB ID.

4. The base station of claim 2, wherein the one or more processors, to receive the IP address associated with the neighboring base station, are configured to:

receive, from the DNS server, an IP address associated with a DNS resource record that includes the base station identifier for the neighboring base station.

5. The base station of claim 4, wherein the DNS resource record is configured with a wildcard character preceding the base station identifier for the neighboring base station, such that the DNS resource record matches with the query based at least in part on the subset of bits that includes the base station identifier.

6. The base station of claim 1, wherein the query includes a fully qualified domain name (FQDN) that includes the set of bits in the cell identifier, in a reverse order from that of the cell identifier.

7. The base station of claim 6, wherein the set of bits includes a full quantity of bits included in the cell identifier.

8. The base station of claim 6, wherein the set of bits includes a quantity of bits included in the cell identifier, and wherein the quantity is associated with a maximum number of bits for a base station identifier included in the cell identifier.

9. A method of wireless communication performed by a base station, comprising:

receiving a cell identifier associated with a neighboring base station;

transmitting, to a domain name system (DNS) server, a query constructed based at least in part on reversing a set of bits in the cell identifier; and receiving, from the DNS server and based at least in part on the query, an Internet Protocol (IP) address associated with the neighboring base station.

10. The method of claim 9, wherein a subset of bits, of the set of bits in the cell identifier, includes a base station identifier for the neighboring base station.

11. The method of claim 10, wherein the cell identifier is an NR cell identity (ID), and wherein the base station identifier is a gNB ID.

12. The method of claim 10, wherein receiving the IP address associated with the neighboring base station comprises:

receiving, from the DNS server, an IP address associated with a DNS resource record that includes the base station identifier for the neighboring base station.

13. The method of claim 12, wherein the DNS resource record is configured with a wildcard character preceding the base station identifier for the neighboring base station, such that the DNS resource record matches with the query based at least in part on the subset of bits that includes the base station identifier.

14. The method of claim 9, wherein the query includes a fully qualified domain name (FQDN) that includes the set of bits in the cell identifier, in a reverse order from that of the cell identifier.

15. The method of claim 14, wherein the set of bits includes a full quantity of bits included in the cell identifier.

16. The method of claim 14, wherein the set of bits includes a quantity of bits included in the cell identifier, and wherein the quantity is associated with a maximum number of bits for a base station identifier included in the cell identifier.

17. A non-transitory computer-readable medium storing a set of instructions for wireless communication, the set of instructions comprising:

one or more instructions that, when executed by one or more processors of a base station, cause the base station to:

receive a cell identifier associated with a neighboring base station;

transmit, to a domain name system (DNS) server, a query constructed based at least in part on reversing a set of bits in the cell identifier; and receive, from the DNS server and based at least in part on the query, an Internet Protocol (IP) address associated with the neighboring base station.

18. The non-transitory computer-readable medium of claim 17, wherein a subset of bits, of the set of bits in the cell identifier, includes a base station identifier for the neighboring base station.

19. The non-transitory computer-readable medium of claim 18, wherein the cell identifier is an NR cell identity (ID), and wherein the base station identifier is a gNB ID.

20. The non-transitory computer-readable medium of claim 18, wherein the one or more instructions, that cause the base station to receive the IP address associated with the neighboring base station, cause the base station to:

receive, from the DNS server, an IP address associated with a DNS resource record that includes the base station identifier for the neighboring base station.

21. The non-transitory computer-readable medium of claim 20, wherein the DNS resource record is configured with a wildcard character preceding the base station identifier for the neighboring base station, such that the DNS resource record matches with the query based at least in part on the subset of bits that includes the base station identifier.

22. The non-transitory computer-readable medium of claim 17, wherein the query includes a fully qualified domain name (FQDN) that includes the set of bits in the cell identifier, in a reverse order from that of the cell identifier.

23. The non-transitory computer-readable medium of claim 22, wherein the set of bits includes a full quantity of bits included in the cell identifier.

24. The non-transitory computer-readable medium of claim 22, wherein the set of bits includes a quantity of bits included in the cell identifier, and wherein the quantity is associated with a maximum number of bits for a base station identifier included in the cell identifier.

25. An apparatus for wireless communication, comprising:

means for receiving a cell identifier associated with a base station;

means for transmitting, to a domain name system (DNS) server, a query constructed based at least in part on reversing a set of bits in the cell identifier; and means for receiving, from the DNS server and based at least in part on the query, an Internet Protocol (IP) address associated with the base station.

26. The apparatus of claim 25, wherein a subset of bits, of the set of bits in the cell identifier, includes a base station identifier for the base station.

27. The apparatus of claim 26, wherein the cell identifier is an NR cell identity (ID), and wherein the base station identifier is a gNB ID.

28. The apparatus of claim 26, wherein the means for receiving the IP address associated with the base station comprises:

means for receiving, from the DNS server, an IP address associated with a DNS resource record that includes the base station identifier for the base station.

29. The apparatus of claim 28, wherein the DNS resource record is configured with a wildcard character preceding the base station identifier for the base station, such that the DNS resource record matches with the query based at least in part on the subset of bits that includes the base station identifier.

30. The apparatus of claim 26, wherein the query includes a fully qualified domain name (FQDN) that includes the set of bits in the cell identifier, in a reverse order from that of the cell identifier.

* * * * *